United States Patent [19]
Slaton

[11] Patent Number: 5,975,552
[45] Date of Patent: Nov. 2, 1999

[54] SELF-ALIGNING TRAILER HITCH

[76] Inventor: James Olan Slaton, P.O.Box 562, McCall, Id. 83638

[21] Appl. No.: 08/982,997

[22] Filed: Dec. 2, 1997

[51] Int. Cl.⁶ .................................................... B60D 1/40
[52] U.S. Cl. ..................................... 280/478.1; 280/479.3
[58] Field of Search ................................ 280/477, 478.1, 280/479.1, 479.2, 479.3, 480.1, 491.5

[56] References Cited

U.S. PATENT DOCUMENTS

| | | | |
|---|---|---|---|
| 2,708,045 | 5/1955 | Shontz | 214/506 |
| 3,201,144 | 8/1965 | Smyser | 280/477 |
| 3,319,977 | 5/1967 | Quandt et al. | 280/475 |
| 3,740,078 | 6/1973 | Murr | 280/478.1 |
| 3,989,270 | 11/1976 | Henderson | 280/479.3 |
| 4,125,272 | 11/1978 | Putnam, Jr. et al. | 280/478 B |
| 4,215,875 | 8/1980 | Younger | 280/478 B |
| 4,254,969 | 3/1981 | Martin | 280/478 B |
| 4,773,667 | 9/1988 | Elkins | 280/479.3 |
| 5,277,446 | 1/1994 | Hamel | 280/477 |

*Primary Examiner*—Kevin Hurley
*Attorney, Agent, or Firm*—Frank J. Dykas

[57] ABSTRACT

A trailer hitch which is attached to a vehicle which is towed, such as a trailer, and is used to connect the towed vehicle to a conventional towing ball of a towing vehicle. The trailer hitch of this invention is extendible by the user so as to enable a towed vehicle to be connected to a towing vehicle when the two are approximately aligned, but they need not be precisely aligned.

8 Claims, 6 Drawing Sheets

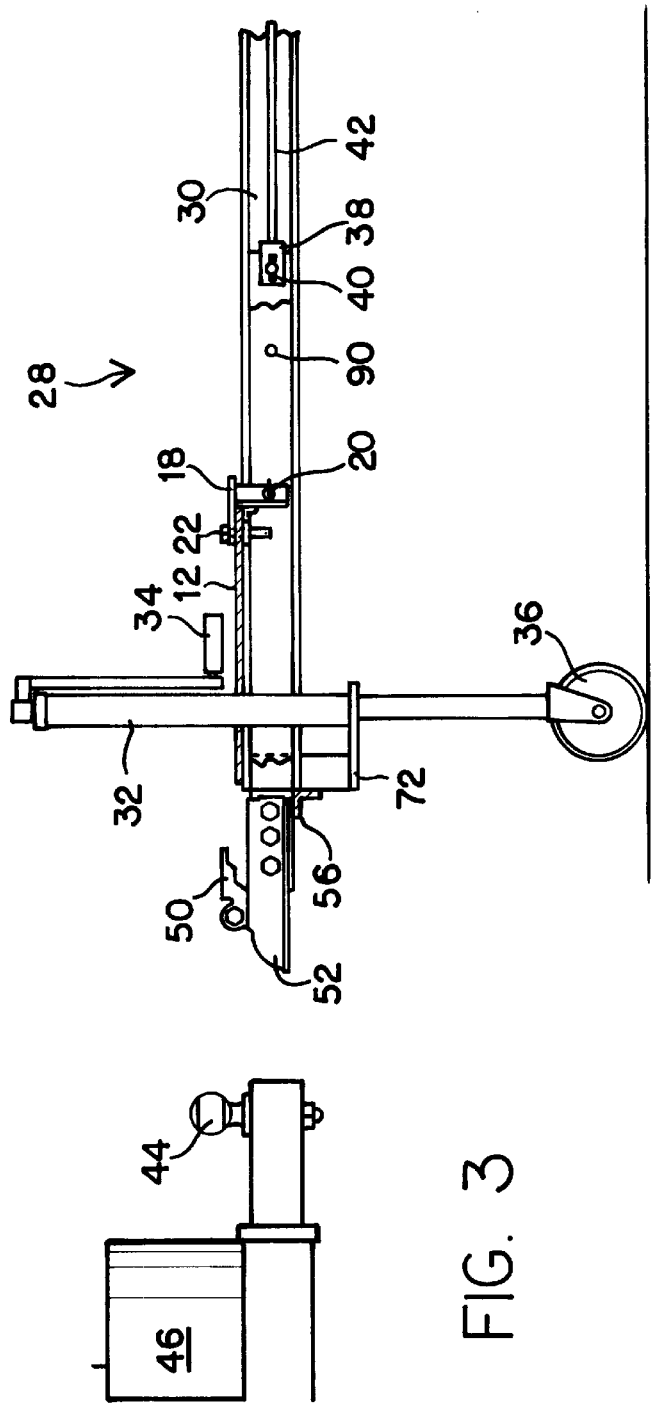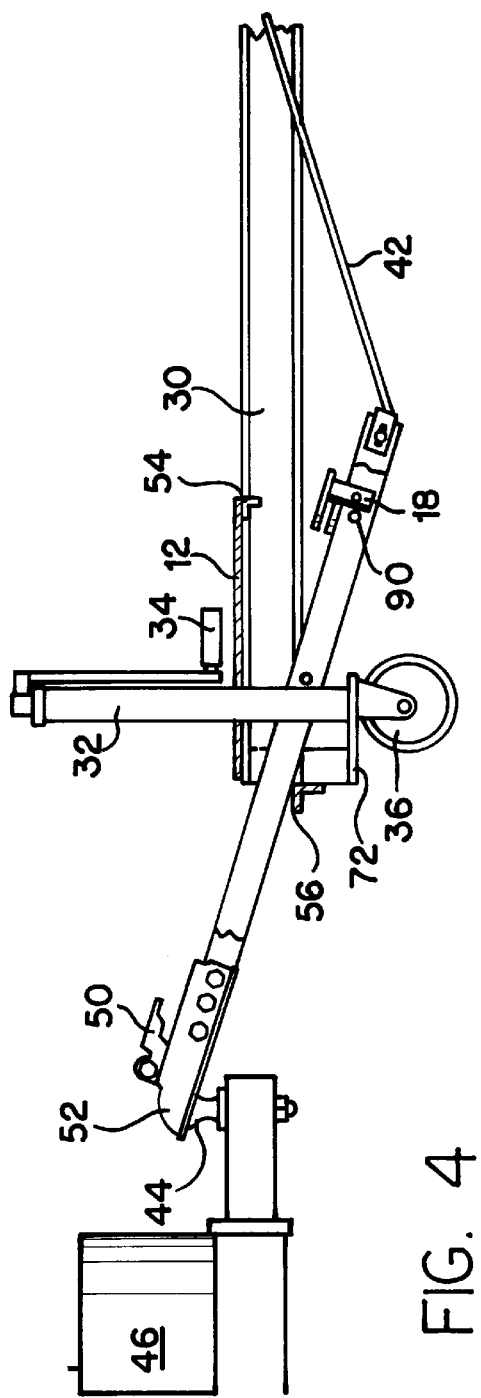
FIG. 3
FIG. 4

SELF-ALIGNING TRAILER HITCH

BACKGROUND OF THE INVENTION

1. Field of the Invention

The present invention generally relates to hitches for towed vehicles, and more particularly to self-aligning hitches for towed vehicles.

2. Description of Related Art

It is a common challenge for drivers of vehicles which tow another vehicle, such as a boat trailer, utility trailer, or any other type of trailer, to experience difficulties in aligning the towing ball of the towing vehicle with the trailer hitch of the towed vehicle. This problem is lessened when there is a person who can stand within view of the driver of the towing vehicle and use hand signals to direct him to a position in which the towing ball is directly underneath the trailer hitch. Once thus aligned, the tongue of the trailer can be lowered until the trailer hitch descends onto the towing ball, and can be secured in place with a hitch latch. Since the trailer hitch is only slightly larger than the towing ball, this alignment must be relatively precise. This alignment problem is worse when there is no person to direct the backing and alignment of the trailer and the towing vehicle. In such a case, the driver uses side or rear view mirrors and gets the towing vehicle as close to the trailer hitch as possible. This may require many trips from the cab of the towing vehicle back to the trailer hitch to verify the position. If a trailer does not have much weight on its tongue, the driver can often pull the trailer tongue to one side or the other until it is over the towing ball. However, if a trailer hitch is too heavy to move, the towing vehicle must be moved back and forth until the alignment is correct.

A number of attempts have been made to deal with this problem. One way to deal with the problem has been to provide a trailer hitch which moves from side to side and in and out of the trailer tongue, in order to facilitate attachment. Once such a trailer hitch is dropped on to the towing ball, the towing vehicle pulls forward slightly to align the long axis of the trailer with the long axis of the towing vehicle, and then the towing vehicle can move in a reverse direction and push the extendable tongue back into the trailer tongue. Once this is accomplished, the extendable trailer hitch can be locked in place, and the towing vehicle can drive off with the trailer. The problem with this method is that the towing vehicle is utilized to push the extendable hitch back into the trailer tongue. When this occurs, the entire trailer may move backward rather than remain stationary. The user would have to block in back of the trailer wheels so that the trailer would not tend to move backward during this backing-up procedure, due to the friction of steel sliding against steel as the tongue slides back. This would also necessitate carrying blocks for this purpose, and having to stow them somewhere, or else finding rocks or something else with which to block the trailer wheels. The trailer hitch of the invention thus necessitates getting out of a towing vehicle only one time, versus two, three, or more times for the self-aligning trailer hitches of other inventions. Additionally, if the extendable trailer hitch is jointed, the entire weight of the trailer will be placed on the joint. This limits the amount of weight that such a system can accommodate, or it may lead to the premature failure of the joint.

What is needed, then, is a trailer hitch which allows the connection of the towing vehicle to a towed vehicle if the two are merely in approximate alignment. This needs to be done so that the extendable hitch is strong enough to support the weight of the trailer in its extended position. The extendable hitch needs to be adjustable both side to side as well as up in order to connect to the towing ball. Additionally, the extendable trailer hitch needs to be drawn back into the trailer tongue without the need for pushing in reverse by the towing vehicle. Preferably, the towing vehicle would remain stationary while the extendable hitch is retracted into the trailer tongue and secured in place for highway travel.

Accordingly, it is an object of the invention to provide a self-aligning trailer hitch which extends from a trailer tongue, and moves laterally as well as vertically.

Another object of the invention is to provide a self-aligning trailer hitch with an extendable hitch which does not contain joints as the mechanism for allowing it to move laterally, as well as vertically.

A further object of the invention is to provide a self-aligning trailer hitch which can be extended to connect to a towing ball, and retrieved back into the trailer tongue without the need for pushing it in by the reverse movement of the towing vehicle.

It is a further object of the invention to retract the extendible trailer hitch by the use of a winch, which pulls the extendable trailer hitch into a secure and lockable configuration for towing.

Another object of the invention is to provide a self-aligning trailer hitch which can be completely removed from the trailer on which it is mounted.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects and advantages are obtained by a trailer hitch which is attached to a vehicle which is towed, such as a trailer, and is used to connect the towed vehicle to the conventional towing ball of a towing vehicle. The trailer hitch of this invention is extendable by the user so as to enable a towed vehicle to be connected to a towing vehicle when the two are approximately aligned, but they need not be precisely aligned. This is unlike most trailer hitches which require a fairly precise alignment of the towing ball of the towing vehicle and the trailer hitch of the towed vehicle. The self-aligning feature of this trailer hitch is accomplished by the trailer hitch being extendable and retractable from the tongue of the trailer. Once extended and connected to a towing vehicle, the trailer hitch of this invention is retracted by the use of a winch and a cable. Once retracted, the trailer hitch of the invention is locked into place and functions as a conventional trailer hitch.

The trailer hitch includes a mounting plate which is a flat metal plate which conforms to the configuration of the trailer tongue. Thus, it can be trapezoidal or triangular, or whatever the shape of the tongue of the trailer is. The trailer hitch also includes a left and a right tongue rail. Each of these tongue rails includes a first end and a second end, which are joined at each of their ends to each other. The trailer hitch also includes a pivot post around which the left and right tongue rails pivot. They can also extend or retract, and do so while mounted on either side of the pivot post. The trailer hitch also includes a hitch head which is attached to the first end of the left and right tongue rails. The hitch head includes conventional hitch components, such as a hitch cup which sits on top of the towing ball, and a ball latch which traps and locks the towing ball in the hitch cup. Also included in the invention is a winch cable which is attached to the second end of the left and right tongue rails. The winch cable extends to a winch, which is part of the trailer hitch. The winch is attached to the frame of the trailer and to an end of the winch cable. The winch cable unwinds from the winch and winds back on to the winch when cranked by the operator.

When the left and right tongue rails extend out in order to connect to a towing ball, they are in a connecting position. Once connected, the winch cable and the winch pull the left and right tongue rails back into the trailer tongue, where the trailer hitch is locked into a towing position. The trailer hitch is locked into place by the use of a lock plate which solidly connects the left and right tongue rails to the mounting plate.

The trailer hitch also includes a front and rear slide plate, which are mounted to the underside of the mounting plate. The left and right tongue rail rests upon the front and rear slide plate. When the left and right tongue rail are extended to one side of the center line of the trailer, and then retracted back into a centered position, the left and right tongue rails slide upon the front and rear slide plates in this process. The purpose of the front and rear slide plate is to allow this lateral movement of the left and right tongue rails in a way that decreases the friction on these pieces.

A trailer hitch would also typically include a conventional trailer tongue jack which is mounted through the pivot post of the trailer hitch. The tongue jack has an extendable post and a wheel which is cranked up and down by a conventional trailer jack apparatus. The trailer hitch also includes vertically oriented guide bars, which limit the lateral travel of the left and right tongue rails.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

BRIEF DESCRIPTION OF THE DRAWINGS

FIG. 3 is a side view of the trailer hitch.

FIG. 4 is a side view of the trailer hitch with the tongue extended.

DESCRIPTION OF THE PREFERRED EMBODIMENTS

Figure 1:
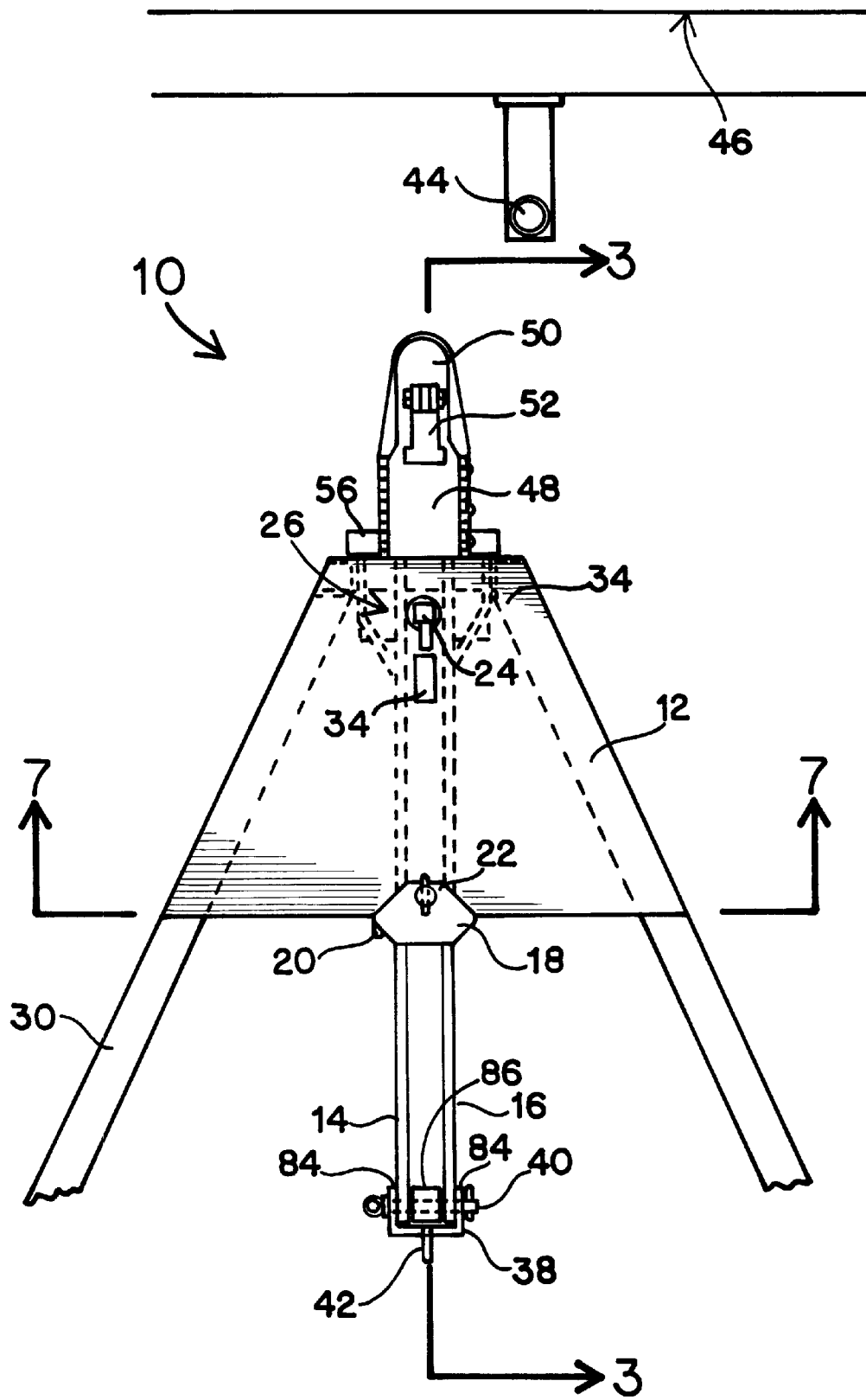
FIG. 1 is a top view of the trailer hitch

The preferred embodiment of the invention is shown in the figures. FIG. 1 is a top view of the device. Referring to FIG. 1, trailer hitch 10 is shown. Trailer hitch 10 is preferably made of steel, although other materials of suitable strength and weight characteristics could also be used. The trailer hitch 10 is attached to a towed vehicle 28 which typically would be a trailer. The towed vehicle or trailer could include utility trailers, camping trailers, the trailers of tractor trailer rigs, horse trailers, boat trailers, or any type of trailer which is towed behind another vehicle. In a typical installation, the trailer hitch 10 is mounted on the trailer tongue 30 of the trailer. FIG. 1 shows a typical mounting of a trailer hitch 10 on a trailer tongue 30 of a towed vehicle 28.

Figure 7:
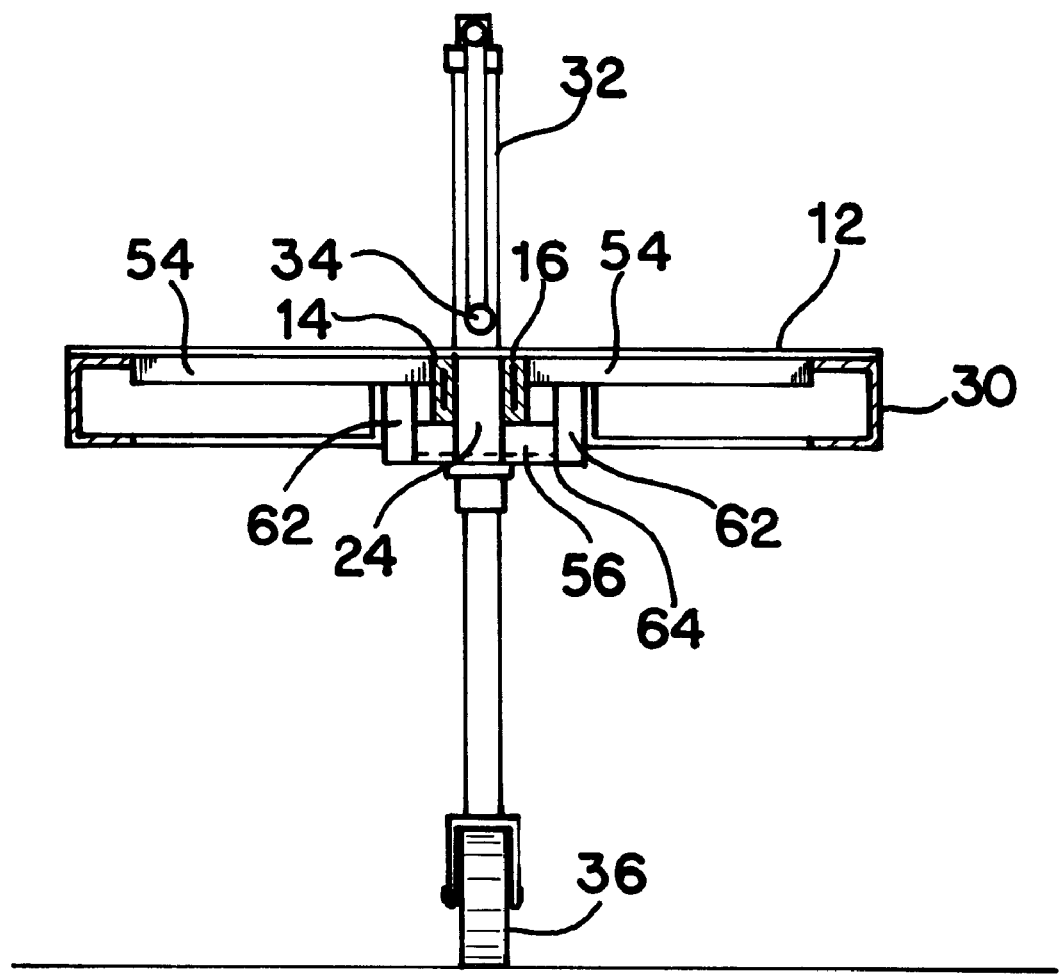
FIG. 7 is a cross-sectional view through the tongue of the trailer looking at the trailer hitch.

On top of the trailer tongue 30 is mounted a flat mounting plate 12 which could be welded or bolted to the side rails of trailer tongue 30. Attached to the underside of mounting plate 12 are two guide bars 62 which are typically mounted at a 90° angle from the mounting plate 12, and extend about 3⅛" from the mounting plate. A front slide plate 56 is mounted between the two guide bars 62. The guide bars 62 and the front slide plate 56 are shown in FIG. 7. Also attached to mounting plate 12 is a pivot post 24. In the preferred mode, the pivot post 24 is a cylindrical steel section with an inside diameter of 1½ inches and a wall of an outside diameter of approximately 1¾ inch thickness. It is approximately 5½ inches long, and extends below mounting plate 12. The mounting plate 12 has a hole which corresponds to the inside diameter of pivot post 24. On the end of pivot post 24 which is not attached to the mounting plate 12, is located a post plate 72 as shown in FIGS. 3, 4 and 7. Post plate 72 is a generally rectangular plate of metal which is anchored at two of its corners to guide bars 62. At the edge of mounting plate 12 which is nearest to the towed vehicle 28 is located a rear slide plate 54. Rear slide plate 54 is a ridge of metal which can be formed from angle iron which is attached to mounting plate 12. At the center of rear slide plate 54 is located a notch into which the two tongue rails 14 and 16 fit. Extending between the front slide plate 56 and the mounting plate 12, and on either side of pivot post 24 is a left tongue rail and a right tongue rail. These are clearly seen in FIGS. 1, 2 and 7. Left and right tongue rails 14 and 16 are made from rectangular steel tubing in the preferred mode, and are approximately 1 inch by 3 inches, with a wall thickness of ⅛ inch. Channel, round or square tubing, or angle sections of steel would also be suitable. Their length can be variable, with 30 inches the length in the preferred embodiment. They are joined together at their second end by cable plate 38 and at a first end by hitch head 48. Hitch head 48 also includes hitch cup 50 and ball latch 52.

Figure 2:
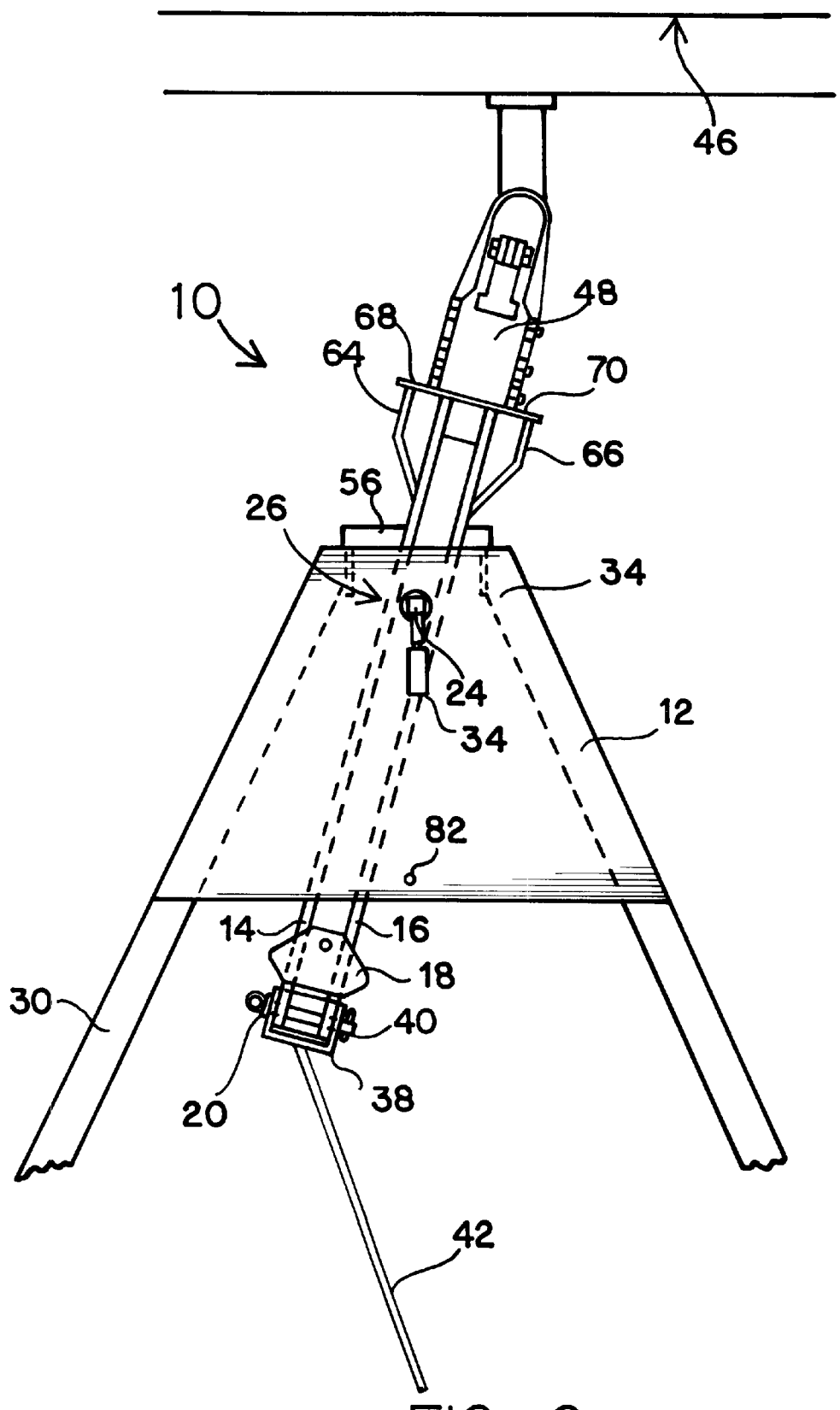
FIG. 2 is a top view of the trailer hitch with the tongue extended.

Attached to left tongue rail 14 and right tongue rail 16 are left tongue guide 64 and right tongue guide 66. These are angled pieces of steel which are attached to left shoulder 68 and right shoulder 70, as shown in FIG. 2. In the preferred mode, left and right shoulder 68 and 70 are steel, approximately 2 inches long.

In the preferred embodiment, a tongue jack 26 is mounted on the mounting plate 12 and extends through the pivot post 24. This is best shown in FIGS. 3 and 4. Tongue jack 26 includes a jack cylinder 32, a crank handle 34, and a wheel 36.

Figure 6:
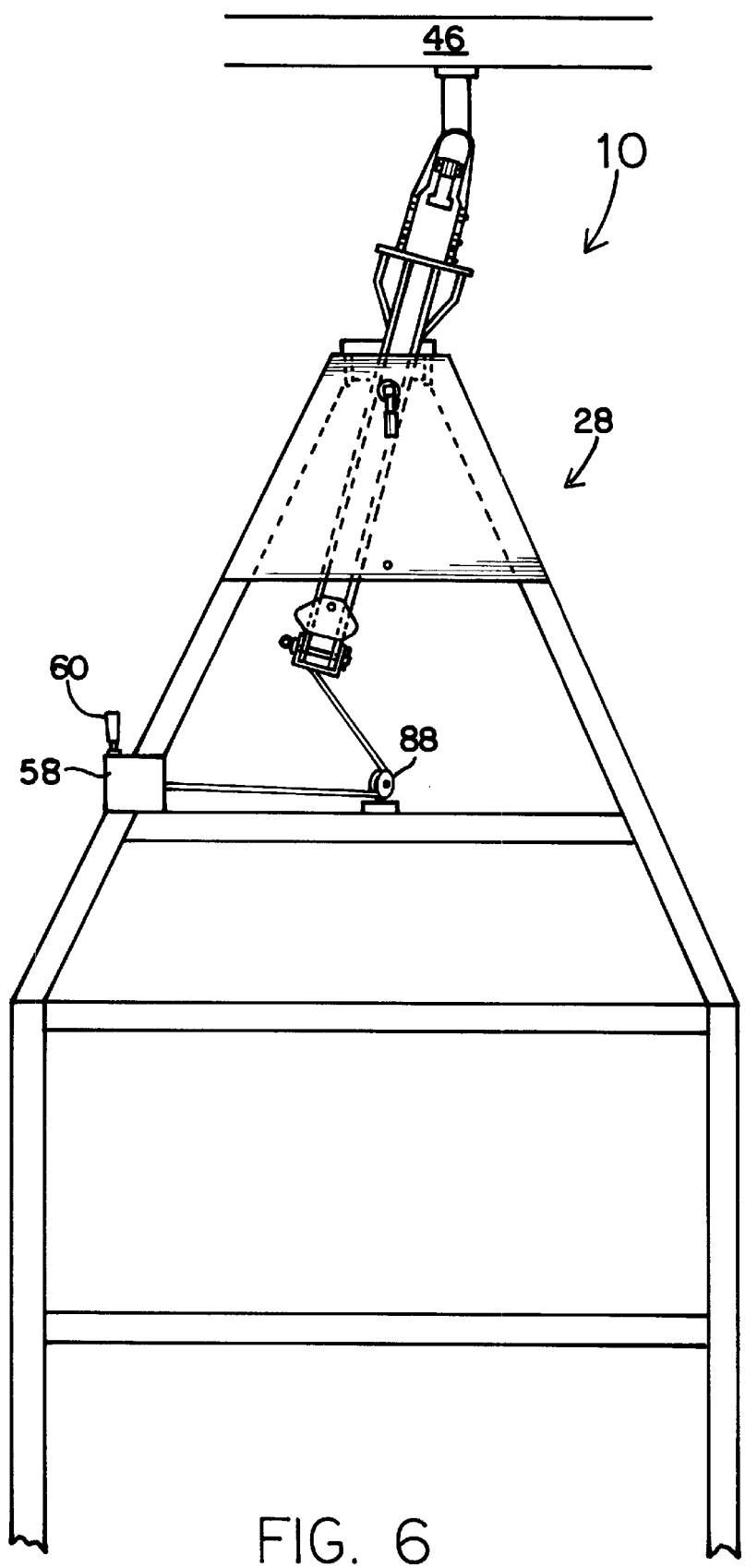
FIG. 6 is a top view of the trailer hitch showing part of the trailer frame.

Cable plate 38 has two extensions 84 which fit on the outside of left tongue rail 14 and right tongue rail 16. Cable plate 38 also has a rectangular mid piece 86 which fits between the left tongue rail 14 and right tongue rail 16, as shown in FIG. 1. Attached to cable plate 38 is a winch cable 42 which is itself attached to a winch 58. The winch is shown in FIG. 6. Although FIG. 6 shows the winch being mounted at the front of the trailer on a frame member of the trailer tongue, and passing through a pulley 88, in actual practice the winch could be mounted in a number of places and would function equally well. The pulley 88 must be mounted directly in the longitudinal axis of the towed vehicle 28. As shown in FIG. 6, pulley 88 in the preferred embodiment is mounted two to three inches from the end of the retracted trailer hitch 10 and the cable plate 38. The pulley is preferably approximately one inch above the longitudinal axis of the trailer tongue 30. This adds lift on the rear of the trailer hitch 10 when it is being winched into place, which is necessary for ease in pushing the lock plate 18 and the main pin 20 in place. This positioning of the pulley is critical enough that another member of some sort on the trailer frame may have to be added so that the pulley is mounted no further than four inches from the cable plate 38 when the trailer hitch 10 is in the retracted position. Cable plate 38 is mounted to left tongue rail 14 and right tongue rail 16 by a cable plate pin 40 which passes through the extensions 84 of cable plate 38, through the mid piece 86, and through corresponding holes in left tongue rail 14 and right tongue rail 16.

Figure 5:
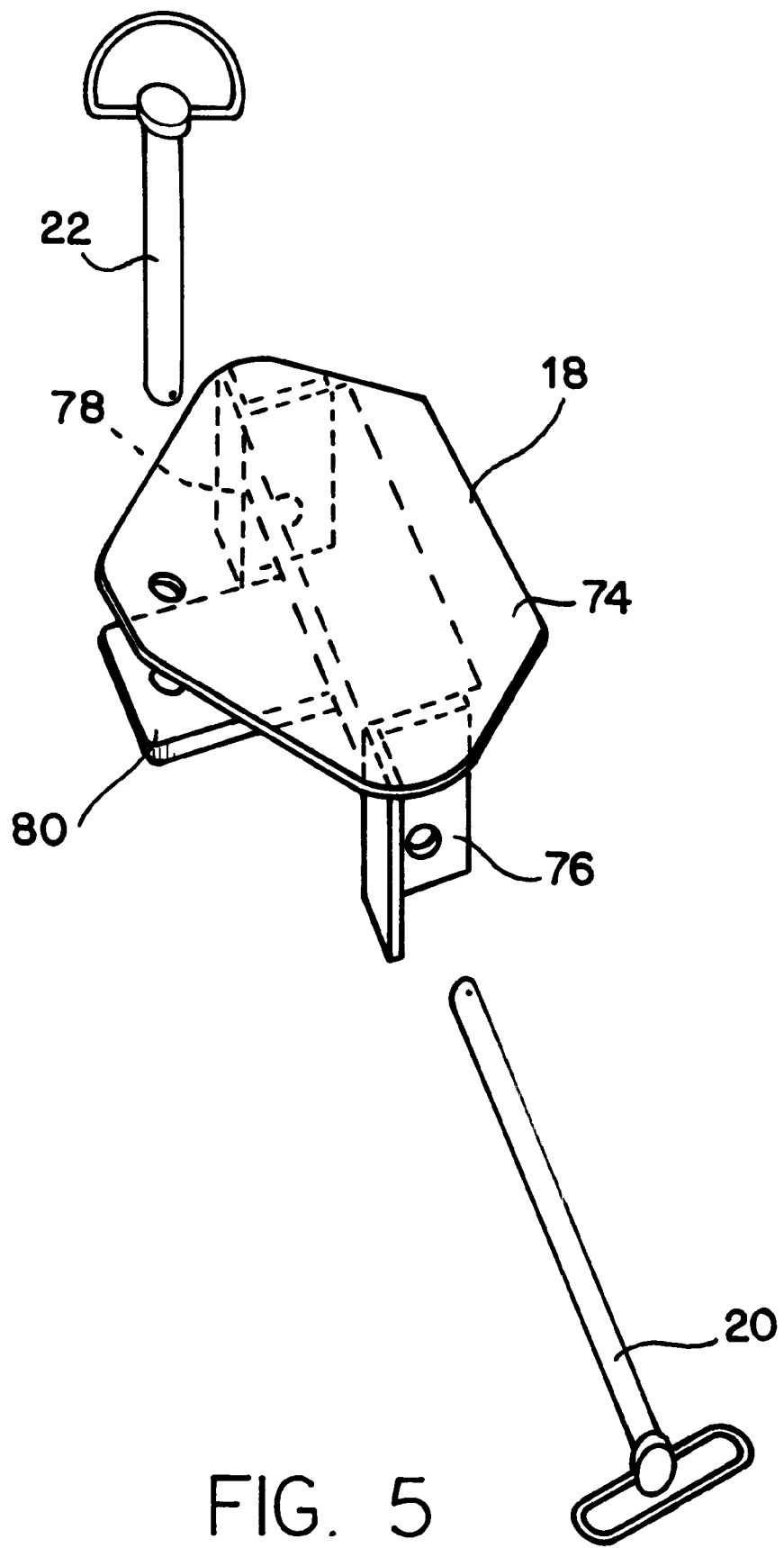
FIG. 5 is a perspective view of the lock plate.

Also included in trailer hitch 10 is a lock plate 18 shown in FIG. 5. Lock plate 18 has a top plate 74 to which is attached a left leg 76 and a right leg 78 which are pieces of angled steel in the preferred embodiment. Mounted between left leg 76 and right leg 78 is bottom plate 80. Both bottom plate 80 and top plate 74 have a hole through which top pin 22 fits. Left leg 76 and right leg 78 also each have holes through which main pin 20 fits. The lock plate 18 rides on top of left tongue rail 14 and right tongue rail 16 and slides into place at the rear of mounting plate 12. Mounting plate 12 has a hole 82 which aligns with the hole in top plate 74 and bottom plate 80, and through which top pin 22 extends. Left tongue rail 14 and right tongue rail 16 also have holes which can be lined up with the holes in left leg 76 and right leg 78, and through which main pin 20 can be passed.

In use, the trailer hitch 10 is kept in either a mounted or dismounted position. The trailer hitch 10 can also be completely removed from the trailer tongue 30, by removing the cable plate 38 and then removing the trailer tongue 30 with the hitch cup 50 and the ball latch 52, as well as the left tongue rail 14 and right tongue rail 16. Removing the trailer hitch 10 in this manner makes it virtually impossible for someone to hitch on to the trailer and steal it by towing it away. It can also be useful if the trailer is stored in a garage which has limited space, and where shortening the trailer tongue by several inches or feet would be beneficial. These are additional benefits of the trailer hitch.

In the dismounted position, the trailer hitch 10 is as shown in FIGS. 1 and 3. The tongue jack 26 is extended so that wheel 36 is on the ground and the frame of the towed vehicle 28 is generally horizontal. The left and right tongue rail are withdrawn into the trailer tongue 30 so that the hitch head 48 is adjacent to the leading edge of the mounting plate 12. The lock plate 18 is adjacent to the rear edge of the mounting plate 12 and top pin 22 extends through the hole in top plate 74, hole 82 in mounting plate 12, and through the hole in bottom plate 80. Main pin 20 extends through left leg 76, the hole in left tongue rail 14, the hole in right tongue rail 16, and the hole in right leg 78. Winch 58 is adjusted using winch handle 60 so that the winch cable 42 is without slack, but need not be taut.

To convert from the dismounted to the mounted mode, towing vehicle 46 is backed to approximate proximity with hitch head 48. This is generally to within 20 inches in front of hitch head 48, at an angle as much as 25° to either side of the centerline of the trailer, and about 25° above horizontal. Within this range, hitch head 48 can be extended to contact and be locked into place on towing ball 44 of towing vehicle 46. Greater extensions and angles are of course possible if the tongue rails are made longer, or if the guide bars are spaced further apart. To extend hitch head 48, the lock plate 18 is first disconnected by removing top pin 22 and main pin 20 and sliding lock plate 18 away from the back edge of mounting plate 12. Using winch handle 60, winch 58 is turned to provide slack in winch cable 42. The hitch head 48 is pulled out from the trailer tongue 30 and in doing so, left tongue rail 14 and right tongue rail 16 are pulled past pivot post 24. In this manner, hitch head 48 can extend forward, or rotate to the right or to the left, or up, as shown in FIGS. 2 and 4. If hitch head 48 needs to go down in order to contact the towing ball 44, the wheel 36 can be raised toward the trailer tongue 30 until the extended hitch head 48 is in the right position to contact towing ball 44.

Once the hitch head 48 is in place slightly above towing ball 44, the tongue jack 26 is cranked to raise the wheel 36 and thereby lower the trailer tongue 30 onto the towing ball 44. When the hitch cup 50 is in contact with the towing ball 44, the ball latch 52 can be used to lock the two together. The wheel 36 is then fully raised. At this point, the winch handle 60 can be used to activate the winch 58 and wind winch cable 42 onto the winch. Although a manual winch is shown, an electric winch could also be used and would function equally well. As noted above, the winch and its controls could be located in a number of positions on the trailer. As the winch 58 continues to wind winch cable 42 on to the winch, the force on the winch cable 42 causes the left tongue rail 14 and the right tongue rail 16 to rotate around pivot post 24 and to move to a centered position. The continued tightening of the winch cable 42 causes the left tongue rail 14 and the right tongue rail 16 to move from an angled up position shown in FIG. 2 to a generally horizontal position as shown in FIG. 3. As the winch cable 42 continues to tighten, hitch head 48 is drawn toward trailer tongue 30. The left tongue guide 64 and the right tongue guide 66 contact the guide bars 62, which helps guide the left tongue rail 14 and the right tongue rail 16 into place. As the left tongue rail 14 and the right tongue rail 16 are moving from an angled position as shown in FIG. 2 to a centered position as shown in FIG. 1, they slide laterally and longitudinally across front slide plate 56 and rear slide plate 54. As the left tongue rail 14 and right tongue rail 15 are brought into final position, they fit into a slot in rear slide plate 54. In this position, lock plate 18 is slid into place with top plate 74 above mounting plate 12 and hole 82 and bottom plate 80 beneath mounting plate 12. Top pin 22 is then inserted and main pin 20 is inserted through the holes in left leg 76, right leg 78, and the left tongue rail 14 and the right tongue rail 16. The top pin 22 need not be used in every towing situation. However, it is especially useful when the trailer hitch 10 is mounted in an extended position, such as for launching a boat. This will help to keep the towing vehicle out of the water, as an example. A second position mounting hole 90 is shown in FIGS. 3 and 4 for mounting the trailer hitch 10 in an extended position, such as for launching a boat. The trailer hitch 10 is now in the mounted configuration, and the towing vehicle 46 could tow the vehicle 28.

While there is shown and described the present preferred embodiment of the invention, it is to be distinctly understood that this invention is not limited thereto but may be variously embodied to practice within the scope of the following claims.

I claim:

1. A trailer hitch for attaching a towed vehicle to a towing ball of a towing vehicle, comprising:

a mounting plate for securing the trailer hitch assembly to a front end of a trailer, said mounting plate attaching to a pivot post;

a left and right tongue rail, each with a first and second end, which are joined at both their ends to each other, and which are mounted on either side of said pivot post, beyond which the left and right tongue rails are slidably extendable, slidably retractable, and rotatable around said pivot post, and which are configured for a connecting and a towing position, and to which is mounted a hitch head, said left and right tongue rails extending, retracting, or rotating around said pivot post;

a hitch head attached to said first end of said left and right tongue rails which attaches said trailer hitch to said towing ball of said towing vehicle;

a winch cable which is attached to said second end of said left and right tongue rails, and which extends therefrom to a winch; and a winch to which is attached said winch cable, which unwinds said winch cable when said left and right tongue rails are extended or rotated in said connecting position, and which winds cable and thereby causes said left and right tongue rails to retract into said towing position, thereby drawing said towed vehicle and said towing vehicle together, said winch mounted on said towed vehicle.

2. The trailer hitch of claim 1 which further comprises a ball latch on said hitch head.

3. The trailer hitch of claim 1 which further comprises a lock plate for attaching to and for securing said left and right tongue rails to said mounting plate.

4. The trailer hitch of claim 1 which further comprises a front and a rear slide plate mounted to the underside of said mounting plate, which rest upon said left and right tongue rails, and across which said left and right tongue rails slide as they extend, retract, or rotate around said pivot post.

5. The trailer hitch of claim 1 which further comprises a tongue jack which extends through said pivot post and which has an extendable post with a wheel for lifting and supporting said towed vehicle.

6. The trailer hitch of claim 1 which further comprises guide bars which limit the lateral travel of said left and right tongue rails said guide bars attaching to the mounting plate.

7. The trailer hitch of claim 1 wherein said hitch head and said left and right tongue rails can be completely removed from said trailer hitch, for security and storage.

8. A trailer hitch for attaching a towed vehicle to a towing ball of a towing vehicle, comprising:

a mounting plate for securing the trailer hitch assembly to a front end of a trailer, said mounting post attaching to a pivot post;

a left and right tongue rail, each with a first and second end, which are joined at both their ends to each other, and which are mounted on either side of said pivot post, beyond which the left and right tongue rails are slidably extendable, slidably retractable, and rotatable around said pivot post, and which are configured for a connecting and a towing position, and to which is mounted a hitch head, said left and right tongue rails extending, retracting, or rotating around said pivot post;

a hitch head attached to said first end of said left and right tongue rails which attaches said trailer hitch to said towing ball of said towing vehicle;

a winch cable which is attached to said second end of said left and right tongue rails, and which extends therefrom to a winch;

a winch to which is attached said winch cable, which unwinds said winch cable when said left and right tongue rails are extended or rotated in said connecting position, and which winds cable and thereby causes said left and right tongue rails to retract into said towing position, thereby drawing said towed vehicle and said towing vehicle together, said winch mounted on said towed vehicle;

a ball latch on said hitch head, for locking said trailer hitch to said towing ball on said towing vehicle;

a lock plate for attaching to and for securing said left and right tongue rails to said mounting plate;

a front and a rear slide plate mounted to the underside of said mounting plate, which rest upon said left and right tongue rails, and across which said left and right tongue rails slide as they extend, retract, or rotate around said pivot post;

a tongue jack which extends through said pivot post and which has an extendable post with a wheel for lifting and supporting said towed vehicle; and guide bars attached to said mounting plate which limit the lateral travel of said left and right tongue rails, said guide bars attaching to the mounting plate.

* * * * *